United States Patent
Lewis

[11] 3,880,471
[45] Apr. 29, 1975

[54] FLUID PRESSURE METERING DEVICE

[75] Inventor: Richard L. Lewis, South Bend, Ind.

[73] Assignee: The Bendix Corporation, South Bend, Ind.

[22] Filed: Dec. 14, 1973

[21] Appl. No.: 425,003

[52] U.S. Cl. .................................................. 303/6 C
[51] Int. Cl. ............................................. B60t 11/34
[58] Field of Search ............ 303/6 C, 22 R; 188/349

[56] References Cited
UNITED STATES PATENTS

| | | | |
|---|---|---|---|
| 3,358,445 | 12/1967 | Wallace | 303/6 C |
| 3,697,138 | 10/1972 | Marting | 303/6 C |
| 3,721,473 | 3/1973 | Budzich | 303/6 C |

*Primary Examiner*—Trygve M. Blix
*Assistant Examiner*—Stuart M. Goldstein
*Attorney, Agent, or Firm*—Ken C. Decker; William N. Antonis

[57] ABSTRACT

A fluid pressure control device is located in a vehicle brake system between front wheel disc brakes and a master cylinder for regulating the braking force applied to the front brakes in relationship to the braking force applied to the drum brakes associated with the rear wheels of the vehicle. The device includes a housing having an inlet port connected to the master cylinder and an outlet port connected to the disc brakes and a valve mechanism in the housing normally establishing a first flow path between the ports during brake release. Upon a brake application, the valve mechanism permits fluid to flow through the first flow path between the ports up to a first predetermined pressure level at which time fluid communication to the outlet port is interrupted so that the fluid pressure at only the inlet port continues to rise until a second predetermined pressure level is attained whereupon the pressure levels of the inlet and outlet ports will now increase at a preselected ratio up to a third predetermined pressure level at which time the valve mechanism alternately opens and closes so that the fluid pressure levels at the inlet and outlet ports build up at a prescribed relationship until a fourth predetermined pressure level is reached whereupon the valve mechanism reestablishes uninterrupted communication between the ports, permitting the fluid pressure at the ports to rise at the same rate.

10 Claims, 2 Drawing Figures

3,880,471

FLUID PRESSURE METERING DEVICE

BACKGROUND OF THE INVENTION

The invention relates to hydraulic brake systems for automotive vehicles, and more particularly to an improved metering valve which regulates fluid flow to the front wheel disc brakes of a vehicle that is equipped with drum brakes on the rear wheels so that the front and rear brakes are applied substantially simultaneously.

Automotive vehicles employing front wheel disc brakes and rear wheel drum brakes are faced with the vexatious problem of correlating brake lining wear between front and rear brakes. This is due to the fact that when disc brakes are applied they produce a brake stopping torque nearly as soon as hydraulic fluid pressure is developed in the brake system, since disc brakes either do not use shoe return springs or very light springs. On the other hand, drum brakes employ relatively heavy shoe return springs which must be first overcome before the shoes are moved into contact with the brake drum. This arrangement between front and rear brakes has the effect of holding off the drum brakes until sufficient pressure has been developed to overcome the shoe return springs, which means that the front brakes are braking prematurely. Obviously a vehicle using this combination of drum rear brakes and front disc brakes without a metering valve for the front brakes will experience early lining wear of the front brakes due to the early braking torque developed in the latter brakes even during a light brake application. Accordingly, such combinations of disc front and drum rear employ a metering valve for the disc brakes to alleviate the troublesome problem of premature wear of the disc brakes. Metering valves of the type disclosed in U.S. Pat. Nos. 3,462,201 and 3,526,437, assigned to the common assignee of the present invention, have been proposed for such brake system combinations. The metering valves for the prior art have not always permitted optimum matching between the front and rear brakes to produce the most desirable lining wear pattern. Therefore, the present invention is proposed as a substitute for existing metering valves in order to improve the braking relationship between front discs and rear drums.

SUMMARY OF THE INVENTION

A normally open metering valve is located in the hydraulic line between a master cylinder and a disc brake so that during brake release the valve inlet port communicates freely with the valve outlet port whereas upon a brake application communication between the ports is open only up to a predetermined pressure level whereupon communication is closed between the ports in which case the inlet pressure continues to rise with no increase in the outlet pressure until a second predetermined pressure level is attained whereupon the metering valve is urged in a direction to pressurize the fluid at the outlet port in accordance with inlet port pressure up to a third predetermined pressure level whereupon the valve opens and closes alternately permitting the inlet and outlet port pressures to grow at a prescribed ratio until a fourth predetermined pressure level is reached, causing the valve to open completely so that the inlet and outlet pressures now rise at the same rate.

An important object of the invention is to provide a metering valve which holds-off disc brake actuation until the drum brake shoes are in contact with the drums after which the valve responds to a predetermined pressure level to cause the valve to move in a direction of pressurizing the fluid at the outlet port in relationship to the inlet port pressure up to another predetermined pressure level which now alternately opens and closes the valve.

Another important object of the invention is to provide a metering valve of the type herein disclosed which lends itself readily to matching the brake lining wear between front disc brakes and drum rear brakes.

A still further object of the invention is to provide a metering valve of the aforesaid type which includes means for controlling fluid flow therefrom due to thermal expansion.

DETAILED DESCRIPTION

Figure 1:
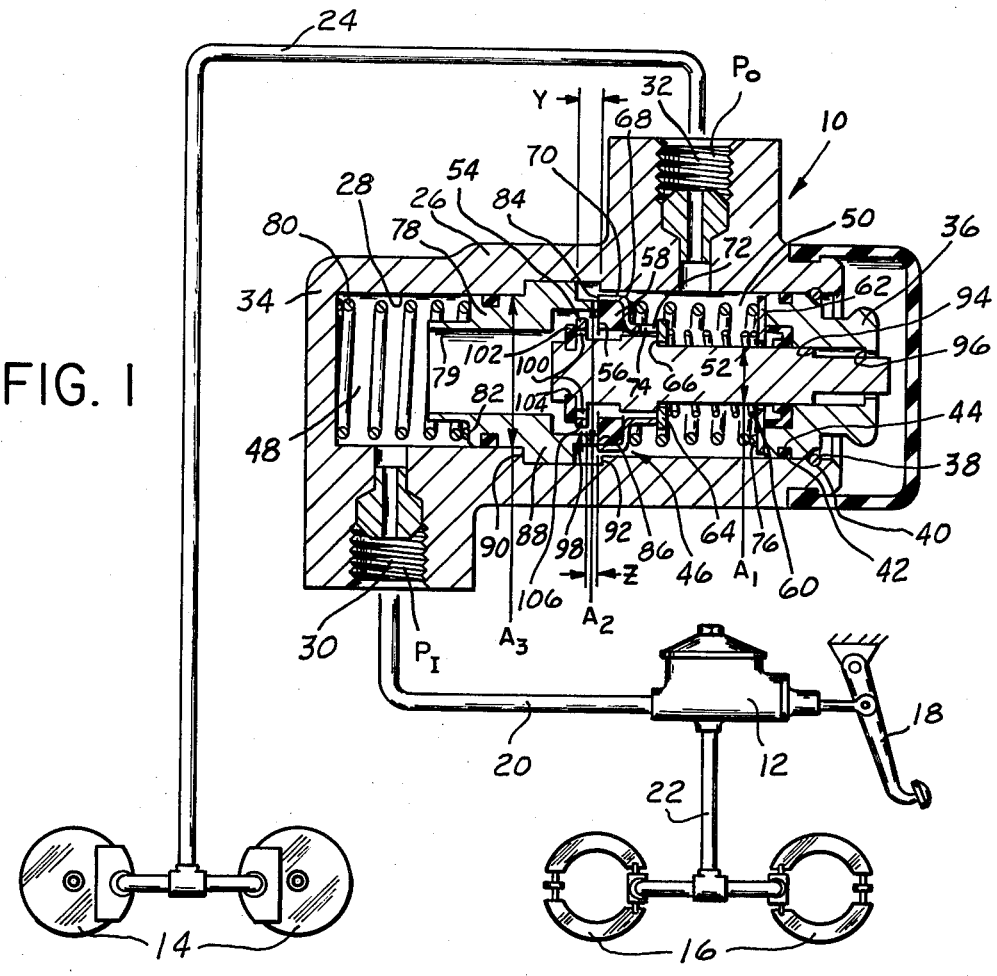
FIG. 1 is a diagrammatic view in longitudinal cross section of the metering valve of the invention illustrated in association with a vehicle hydraulic brake system incorporating a master cylinder for actuating disc and drum brakes.

Referring now to the drawings, FIG. 1 shows one form of automotive vehicle brake system with which the fluid pressure control device 10 is associated for regulating the brake applying force generated by a master cylinder 12 to front wheel disc brakes 14 in relationship to the brake applying force to rear wheel drum brakes 16. The master cylinder or fluid pressure generating means 12, is provided with a foot pedal 18 which, when depressed, forces fluid through conduits 20 and 22, in communication respectively with the valve mechanism 10 and the drum brakes 16. The front disc brakes 14 are connected to the conduit 20 via the control device 10 and conduit 24. The control device 10 is provided with a housing 26 having an axially extending stepped bore 28 in communication with an inlet port 30, to which the conduit 20 is connected, and an outlet port 32, to which the conduit 24 is connected. One end of the bore 28 is closed by a wall 34 of the housing 26 and the other end of the bore is equipped with a plug 36 held in position by a removable retainer member 38 carried in a groove 40 of the bore 28. A seal 42, located in groove 44 of the plug 36, prevents leakage from the bore 28 to the housing exterior.

Valve means 46, located within the stepped bore 28, divides the bore into an inlet chamber 48, communicating with the inlet port 30, and an outlet chamber 50, communicating with the outlet port 32. The valve means 46 includes a piston member 52 reciprocally carried in the bore 28 and slidably supported in the end plug 36 and presenting an effective area $A_1$ to the chamber pressure. The piston 52 is provided with a head portion 54 on its inner end for seating engagement with inner radial portion 56 of a valve member 58 for controlling fluid communication through a first flow path, normally open, between the inlet 30 and outlet 32. This first flow path is defined by the space Z formed by the head portion 54 which overlies the inner radial portion 56. Resilient means, such as a light spring 60, urges the piston 52 to the position shown in FIG. 1, establishing the gap Z aforementioned, to provide the first flow path. The spring 60 is preloaded between a washer 62 which rests on the housing end plug 36 and a washer 64 which abuts an enlarged diameter portion 66 of the piston 52. The valve member 58 is carried in a retainer cage 68 having a forwardly extending wall 70 and a rearwardly extending skirt 72, the latter of which is slotted at 74 to permit the passage of fluid through the first flow path. A heavy spring 76 is preloaded between the washer 62 and the valve member retainer cage 68. A stepped piston member 78, provided with a longitudinal bore 79, is arranged in the stepped bore 28 in coaxial relationship to the valve member 58. A spring 80, of intermediate strength, is preloaded between the end wall 34 of the housing and shoulder 82 of the hollow piston 78 urging the inner end 84 of the hollow piston 78 against the outer radial seat portion 86 of the valve member 58 and presenting an effective area $A_2$ to the chamber 50 in which the outlet pressure $P_o$ acts. Separation between the inner end 84 of the hollow piston and outer radial seat portion 86 of the valve member 58 establishes the second flow path between the inlet and outlet ports 30 and 32. The hollow stepped piston 78 is formed with an enlarged diameter portion 88 slidably positioned between shoulders or abutments 90 and 92 of the bore 28 for controlling the axial position of the hollow piston during brake release and brake application. The hollow piston 78 is held against the shoulder 90 in its brake release position by the force of the heavy spring 76, the net force of which is greater than that of the opposing spring 80. With the brakes fully applied, at which time the inlet pressure $P_I$ is acting on the effective area $A_3$, as viewed in FIG. 1, the enlarged diameter portion 88 abuts the shoulder 92, aided by the spring 80. Design experience shows that the area $A_2$ is substantially equal to or less than the area $A_3$ depending upon design requirements. Also, in a full brake applied position the piston member 52 and valve member 58 are moved to the right, as viewed in FIG. 1, so that shoulder 94 on the piston 52 engages an abutment 96 of the plug 36, thereby axially positioning the piston 52 in its open attitude, establishing the second fluid flow path between the inlet and outlet, at which time the seat portion 84, of the piston 78, is separated from the seat portion 86 of the valve member. A check valve 98 is carried at the inner end of the valve piston 52 and includes a plurality of circumferentially spaced and axially extending passages 100. A flexible washer 102 is securely retained in a groove 104 of the piston head portion 54 so that the inner face 106 of the washer overlies the passages 100, to thereby control reverse flow from the outlet port to the inlet port during brake release. This permits reducing the brake pressure faster than master cylinder pressure. The check valve 98 also functions to relieve any fluid pressure build up in the system between the chamber 50 and the disc brakes 14 due to thermal expansion.

MODE OF OPERATION

Figure 2:
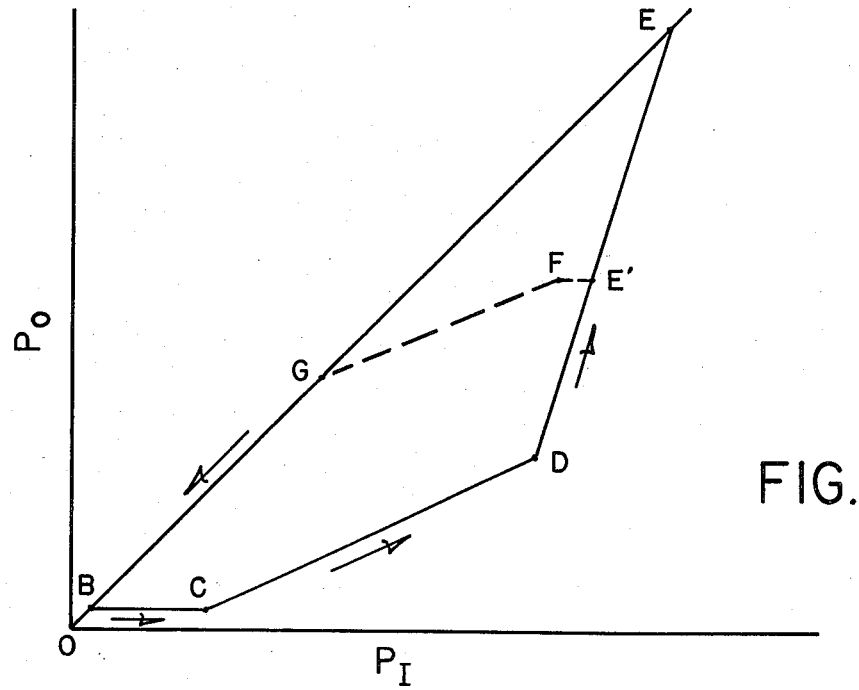
FIG. 2 is a graphical representation of the operation of the valve mechanism of FIG. 1.

Referring to FIG. 1, the component parts of the fluid pressure control device 10 are shown in the position which they occupy during brake release. Depressing the brake pedal 18 develops a hydraulic fluid pressure in the master cylinder 12 which is communicated to the rear drum brakes 16 and the front disc brakes 14. There is no restriction to the pressure build up in the drum brakes causing the brake shoes to move into engagement with the drum. However, as to the front disc brakes 14, fluid under pressure must pass through the control device 10 which includes the valve means 46. With reference to FIG. 2, initially depressing the pedal 18 will generate a pressure $P_I$ at the inlet 30 that is equal to and the same as the pressure $P_o$ at the outlet port 32. This pressure level is indicated on the pressure graph of FIG. 2 as OB. Between the points OB fluid is being displaced from the inlet to the outlet through the gap or space Z formed by the separation of head 54 from the inner radial portion or face 56 of the valve member 58. This pressure $P_I$, represented as OB on FIG. 2 is acting on an effective area $A_1$ of the piston 52 tending to move the piston to the right against the force of the relatively weak spring 60. Upon reaching a first predetermined pressure level B, on the pressure chart of FIG. 2, the space Z between head 54 and face portion 56 is closed, terminating fluid flow to the outlet port 32 and hence the disc brakes. From this point B, as shown on the pressure chart, the fluid pressure $P_I$ continues to rise from B to C with $P_o$ remaining constant since there is no communication between the inlet port and the outlet port and furthermore in moving from point B to point C there is no volume change. Moreover, the preload of the springs 60 and 76 resist displacement of the valve means 46. As $P_I$ increases from B to C there will be no increase in $P_o$ until a seocnd predetermined pressure at point C is reached. It is to be noted that this point C, which gives rise to an increase in $P_o$, is not attained until the preload of heavy spring 76 less the preload of the intermediate spring 80, is overcome. The inlet pressure $P_I$ at this time is acting on the large area $A_3$ aided by the preload of the spring 80. In moving along the curve from point C to point D the springs 60 and 76 are compressed and the spring 80 relaxed or unloaded. Also the enlarged diameter portion 88 is displaced a distance Y so that it abuts the shoulder 92 of the housing. This movement or displacement of the valve means assembly 46 to the right gives rise to a third predetermined pressure at point D. In arriving at the pressure level value of point D, the pressure-displacement relationship of the brake load must be taken into account. Observe that in moving along the curve CD to point D, communication through the first and second flow paths is closed so that the increase in $P_o$ is due to the fluid pressure-displacement resulting from the valve means 46 being displaced into the chamber 50 a distance Y. This action of the valve means displaces fluid in the chamber 50 and the connected disc brake so that $P_o$ increases along the graph CD.

As the brake system pressure from the master cylinder increases further, the $P_I$–$P_o$ pressures change along the path D to E of FIG. 2. At point D, the third predetermined pressure level acting on the effective area of $A_3$, is such as to unseat the valve member 58 from the seat 84, forming the second flow path, thereby communicating chamber 48 with chamber 50. The pressure in chamber 50, which is $P_o$, will continue to rise until the pressure $P_o$ is sufficient, when acting on the effective area $A_2$, to reclose valve member 58 on the seat 84. This metering action between member 58 and seat 84 will continue until a fourth predetermined pressure at point E is sensed. At this time the valve member 58 will be in a wide open position with respect to its seat 84 so that the pressures $P_I$ and $P_o$ will increase along the line O-E extended.

If the brake pressure $P_I$ is released at some point along the curve of FIG. 2 when the inlet pressure $P_i$ is greater than the pressure at point E there will be an equivalent decrease in outlet pressure $P_o$ due to the passage of fluid through the check valve 98 which opens when the inlet pressure becomes less than outlet pressure.

With reference to the region between points B and E of FIG. 2, if brake release occurs at point $E^1$, for example, when inlet pressure $P_I$ is greater than outlet pressure $P_o$ the reduction in the inlet pressure $P_I$ and outlet pressure $P_o$ will follow the points $E^1$ to F to G to B to O. This is due to the fact that when inlet pressure $P_I$ is greater than outlet pressure $P_o$, as is the case at the selected point $E^1$, the outlet $P_o$ is a function of the pressure-displacement characteristics of the hydraulic load of the brake system connected to the chamber 50 of the metering valve. Assuming that the relationship between pressure and displacement is the same for brake application as for brake release the slope of the region F to G will be the same as D-C. The region $E^1$-F, of FIG. 2, shows the output pressure $P_o$ remaining constant while the input pressure $P_I$ diminishes from $E^1$ to F. This results from the fact that the net forces acting in the chamber 50 tending to move the piston 52 to the left must first overcome the net forces holding piston 78 against the shoulder 92. As soon as the opposing forces holding the piston 78 to the right against the shoulder 92 are overcome, the valve assembly 46 is shifted to the left which enlarges the volume of hydraulic fluid within the disc brake system in communication with the chamber 50 thereby causing a reduction in $P_o$.

I claim:

1. In a fluid pressure control device for the hydraulic brake system of an automotive vehicle having disc brakes at one set of wheels and drum brakes at another set of wheels comprising:

a housing having an inlet adapted to be connected to a hydraulic pressure source, an outlet adapted to be connected to the disc brakes, and a bore communicating the inlet with the outlet;

valve means in the bore dividing the bore into an inlet chamber and an outlet chamber, said inlet and outlet chambers communicating respectively, with the inlet and outlet;

said valve means being normally open to establish a first flow path to allow substantially free flow of fluid between the inlet and outlet chambers until a first predetermined pressure level in the inlet chamber is attained, said valve means including first means responsive to said first pressure level to terminate flow of fluid between the inlet and outlet chambers to permit the fluid pressure level in the inlet chamber to increase while the fluid pressure level in the outlet chamber is held at its first predetermined level, said valve means further including second means cooperating with said first means when a second predetermined pressure level in the inlet chamber is reached to displace said valve means into the outlet chamber by the pressure rise at the inlet chamber causing a pressure increase in the outlet chamber, said valve means further including third means cooperating with said first and second means when a third predetermined pressure level is attained to establish a second flow path which alternately opens and closes so that the fluid is metered from the inlet to the outlet until the fluid pressure levels at the inlet and outlet equalize whereupon said first, second and third means permits the valve means to open wide to allow substantially uninhibited flow through the second path from the inlet to the outlet chamber.

2. The invention of claim 1:

said valve means including a valve member slidable in the bore between the inlet and outlet, and first and second pistons coaxially and slidably disposed in the bore for cooperative relationship with said valve member to control flow of fluid between the inlet and outlet chambers in response to changes in the predetermined pressure levels.

3. The invention of claim 2:

said first piston having a head portion which seatably engages the valve member upon reaching the first predetermined pressure level to close the normally open valve means via the first flow path;

and first resilient means in the bore yieldably urging the first piston in a direction to unseat it from the valve member to establish the first flow path.

4. The invention of claim 3:

said second piston being hollow for the passage of fluid between the chambers, said second piston having one end formed to effectuate said cooperative relationship with the valve member and normally seated on the valve member to close the second flow path established between the second piston and the valve member;

and second resilient means in the bore yieldably urging the second piston against the valve member to close said second flow path.

5. The invention of claim 4:

said bore being stepped so as to form a pair of shoulders therein;

said second piston being formed with an enlarged diameter portion thereon for engagement with said pair of shoulders which act to restrict axial movement of the second piston within the bore.

6. The invention of claim 5:

and third resilient means acting concomitantly with said first resilient means urging the first piston in a direction against one of said pair of shoulders in opposition to said second resilient means to close said second flow path, said first and third resilient means opposing movement of the first piston upon attainment of said second and third predetermined pressure levels.

7. The invention of claim 1:

and check valve means located in the bore of said device between the chambers and responsive to a differential in pressure for relieving outlet pressure in excess of inlet pressure so that the outlet pressure is diminished at a greater rate during brake release.

8. The invention of claim 7:

said check valve means incorporating structure of said valve means including a piston formed with a head portion thereon having a series of circumferentially spaced apart axially extending passages therein; and a flexible washer supported on said piston and overlying said passages so as to permit fluid to pass therethrough from outlet to inlet when the inlet pressure is less than outlet pressure.

9. In a metering valve for a vehicle hydraulic brake system having disc brakes at one set of wheels and drum brakes at another set of wheels;

a housing having an inlet connectible to a hydraulic master cylinder and an outlet connectible to the disc brakes, and a bore communicating the inlet with the outlet;

valve means in the bore dividing the bore into an inlet chamber and an outlet chamber, said inlet and outlet chambers communicating respectively, with the inlet and outlet;

said valve means including a valve member positioned in the bore between the inlet and outlet, said valve member being formed with inner and outer radial seating portions thereon, a piston member slidably carried in one end of the bore and formed with a head portion which seats and unseats from said inner radial portion to provide a first flow path between the inlet and outlet, a hollow piston slidably carried in the other end of the bore and formed with a seating surface which seats and unseats from said outer radial portion to provide a second flow path between the inlet and outlet, a relatively light spring urging the head portion of the piston member away from the inner radial portion of the valve member so as to open the first flow path to permit fluid to flow therethrough, a relatively heavy spring urging the valve member and its outer radial portion toward engagement with the seating surface of the hollow piston, a third spring having a strength intermediate said light and heavy springs urging the hollow piston against the outer radial portion of the valve member;

said bore being stepped to provide a pair of axial spaced apart abutments;

said hollow piston having an enlarged diameter section of lesser axial length than the distance between said abutments and slidably received between said axial spaced apart abutments for limiting the axial movement of said hollow piston;

said light and heavy springs urging the valve member and hollow piston toward one end of the bore compressing the third spring so that the enlarged diameter section of the piston engages one of the abutments, to thereby cut off flow of fluid through the second flow path and establish flow through the first flow path;

said enlarged diameter section now being spaced from the other of the abutments due to concerted movement of the valve member and its associated pistons subsequent to closing the second flow path and in response to a predetermined inlet pressure level.

10. The invention of claim 9:

and check valve means carried by the piston member for releasing fluid from the outlet when the pressure therein is greater than inlet pressure;

said check valve means including a plurality of circumferentially spaced apart axially extending passages in the head portion of said piston member; and a flexible washer supported on said piston adjacent the head portion in overlying relationship to the passages to allow fluid to flow from the outlet to the inlet when the inlet pressure is less than outlet pressure.

* * * * *